(12) United States Patent
Oba et al.

(10) Patent No.: US 8,017,058 B2
(45) Date of Patent: Sep. 13, 2011

(54) CASTABLE REFRACTORY POWDER COMPOSITION, PREMIXED MATERIAL PREPARED THEREFROM, METHOD FOR CASTING PREMIXED MATERIAL, AND HARDENED REFRACTORY BODY OBTAINED THEREFROM

(75) Inventors: Jun Oba, Kitakyushu (JP); Kunio Tanaka, Kitakyushu (JP); Nobuyuki Takahashi, Kitakyushu (JP); Takashi Fujisaki, Kitakyushu (JP)

(73) Assignee: Taiko Refractories Co., Ltd., Fukuoka-Ken (JP)

( * ) Notice: Subject to any disclaimer, the term of this patent is extended or adjusted under 35 U.S.C. 154(b) by 287 days.

(21) Appl. No.: 12/240,411

(22) Filed: Sep. 29, 2008

(65) Prior Publication Data

US 2009/0032999 A1  Feb. 5, 2009

Related U.S. Application Data

(62) Division of application No. 10/519,005, filed as application No. PCT/JP03/08280 on Jun. 30, 2003, now abandoned.

(30) Foreign Application Priority Data

Jun. 28, 2002 (JP) ................................. 2002-190229

(51) Int. Cl.
*B28B 3/00* (2006.01)

(52) U.S. Cl. ...................................................... 264/333
(58) Field of Classification Search ................. 264/333, 264/299; 501/124, 127, 89, 120
See application file for complete search history.

(56) References Cited

U.S. PATENT DOCUMENTS 6,409,819 B1 * 6/2002 Ko ................................ 106/707

FOREIGN PATENT DOCUMENTS

| JP | 04-083764 | 3/1992 |
|---|---|---|
| JP | 05-060469 | 3/1993 |
| JP | 06-048845 | 2/1994 |
| JP | 6-293569 | 10/1994 |
| JP | 2000-016843 | 1/2000 |
| JP | 2001-56184 | 2/2001 |

* cited by examiner

*Primary Examiner* — Christina Johnson
*Assistant Examiner* — Larry Thrower
(74) *Attorney, Agent, or Firm* — Sughrue Mion, PLLC

(57) ABSTRACT

A premixed material is obtained by tempering a castable refractory powder composition comprising refractory aggregate, fine refractory powder, alumina cement, a dispersing agent and an alumina cement hydration stopper with water. The hydration stopper is acidic in a state of an aqueous solution. The amount of the hydration stopper is controlled such that the premixed material has a pH of 2 to 7. Immediately after adding and mixing an alumina cement hydration starter to the premixed material, the resultant mixture is cast into a mold. The addition of the hydration starter can be carried out 5 days or more after the production of the premixed material.

5 Claims, 1 Drawing Sheet

CASTABLE REFRACTORY POWDER COMPOSITION, PREMIXED MATERIAL PREPARED THEREFROM, METHOD FOR CASTING PREMIXED MATERIAL, AND HARDENED REFRACTORY BODY OBTAINED THEREFROM

CROSS REFERENCE TO RELATED APPLICATIONS

This application is a Divisional of application Ser. No. 10/519,005 filed Dec. 27, 2004, which is a 371 of PCT International Application No. PCT/JP2003/008280 filed Jun. 30, 2003, claiming priority of JP 2002-190229, filed Jun. 28, 2002, all of the above-noted applications are incorporated herein by reference in their entirety.

FIELD OF THE INVENTION

The present invention relates to a castable refractory powder composition usable for linings of vessels for molten metals such as troughs for blast furnaces, ladles, tundishes, etc., a premixed material prepared therefrom, a method for hardening the premixed material at room temperature without heating, and a hardened refractory body obtained by such a method.

BACKGROUND OF THE INVENTION

Premixed castable refractories (hereinafter referred to as "premixed materials"), which are obtained by tempering castable refractory powder compositions with water or other tempering liquids in advance in other sites than casting sites, such as factories, etc., and transported to the casting sites, have recently become widely used as refractories for linings of vessels for molten metals such as troughs for blast furnaces, ladles, tundishes, etc.

Though the premixed materials suffer from new problems such as hardening with time, the separation of aggregate or water during transportation, etc., they are advantageous over conventional castable refractory materials in (a) reduced unevenness in the properties of refractory bodies obtained therefrom because of a stabilized amount of tempering water and sufficient tempering, (b) the omission of a tempering step leading to reduced labor in site and the generation of no dust, resulting in improved working environment, and (c) no hardening even if a casting operation is once stopped, because the materials are not hardened at room temperature, etc. Because of these advantages, the premixed materials have become widely used.

However, attention has recently become paid to the hardening of the materials again. Because the premixed materials are not hardened at room temperature, it is necessary to harden the materials by some means to remove molds after casting. The premixed materials are hardened usually by heating via the molds. As such a heat-hardening method, JP 4-83764 A and JP 6-48845 A disclose methods for thermally hardening premixed materials containing heat-hardening agents at a temperature of 80° C. or higher. However, these heat-hardening methods are disadvantageous in high casting cost because of energy loss due to heat-hardening, and periodic maintenance due to the thermal deformation of molds, etc. They are also disadvantageous in the reduced strength of the resultant refractory body due to rapid water removal by heating.

To solve the problems of these heat-hardening methods, a method of adding a room-temperature-hardening binder to a premixed material immediately before casting, and hardening the material at room temperature was newly proposed. For instance, JP 5-60469 A uses alumina cement in the form of slurry as the room-temperature-hardening binder. However, because the alumina cement slurry is hardened with time, it cannot be produced in advance, but should be prepared at the time of casting.

On the other hand, JP 2000-16843 A proposes an alumina cement composition having an extremely long working time, its gunning method and an unshaped refractory obtained by such a gunning method. It can be stored and used days after gunning without discarding a castable refractory remaining in an apparatus because of a extremely long working time. Accordingly, the gunning method using such an alumina cement composition enables the reduction of cost and working.

The alumina cement composition of JP 2000-16843 A comprises alumina cement prepared from a clinker having a crystalline mineral composition comprising 60 to 95% by weight of $CaO.2Al_2O_3$, 5 to 30% by weight of $2CaO.Al_2O_3.SiO_2$ and 10% or less by weight of $CaO.Al_2O_3$, and a hardening retarder for the alumina cement. This reference discloses that it is preferable to use as a retarder at least one selected from the group consisting of phosphoric acids, a boric acid, silicofluorides, hydroxycarboxylic acids, polycarboxylic acids, polyhydroxycarboxylic acids, polyoxyalkylenes and saccharides. However, the alumina cement clinker mineral described in this reference comprises $CaO.2Al_2O_3$ and $2CaO.Al_2O_3.SiO_2$ as main components, its hydrating activity is extremely low. Accordingly, though hardening retarders composed of alkaline salts such as sodium tripolyphosphate, sodium citrate, sodium polyacrylate, etc., which are described in Examples of this reference, exhibit an effective retarding effect on the alumina cement based on low-hydrating-activity clinker minerals, their retarding effect on common alumina cement based on high-hydrating-activity $CaO.Al_2O_3$ is as insufficient as failing to reach 24 hours.

OBJECT OF THE INVENTION

Accordingly, an object of the present invention is to provide a castable refractory powder composition containing alumina cement capable of providing a premixed material by tempering with water, which can keep flowability for a long period of time.

Another object of the present invention is to provide a premixed material containing alumina cement, which can keep flowability for a long period of time.

A further object of the present invention is to provide a method for casting such a premixed material comprising making it hardenable at room temperature at the time of casting.

A still further object of the present invention is to provide a hardened refractory body obtained by hardening such a premixed material at room temperature.

DISCLOSURE OF THE INVENTION

As a result of intensive research in view of the above object, the inventors have found that (a) the addition of a material for stopping the hydration reaction of a powder composition containing alumina cement for castable refractories (hereinafter referred to as "hydration stopper") provides a premixed material, which would not be hardened at room temperature for a necessary period of time even after tempering with water, and that (b) the mixing of the above premixed material with a material for recovering hydratability by breaking the hydration-stopping mechanism of alumina cement (hereinafter referred to as "hydration starter") makes the premixed material hardenable at room temperature. The present invention has been completed based on these findings.

Thus, the castable refractory powder composition of the present invention, which is to be tempered with water to obtain a premixed material hardenable by adding a hydration starter, comprises refractory aggregate, fine refractory powder, alumina cement, a dispersing agent and a powdery hydration stopper for the alumina cement, the hydration stopper being a material, which is acidic in a state of an aqueous solution, and the amount of the hydration stopper being controlled such that a premixed material has a pH of 2 to 7.

The premixed material of the present invention is obtained by tempering a castable refractory powder composition comprising refractory aggregate, fine refractory powder, alumina cement, a dispersing agent and a hydration stopper for the alumina cement with water in advance, the premixed material being hardened by adding a hydration starter, the hydration stopper being a material, which is acidic in a state of an aqueous solution, and the amount of the hydration stopper being controlled such that the premixed material has a pH of 2 to 7.

The method of the present invention for casting a premixed material comprises tempering a castable refractory powder composition comprising refractory aggregate, fine refractory powder, alumina cement, a dispersing agent and an alumina cement hydration stopper with water in advance to prepare the premixed material, adding an alumina cement hydration starter to the premixed material and mixing them immediately before casting, and then casting the resultant mixture into a mold. It is preferable to use as the hydration stopper a material, which is acidic in a state of an aqueous solution, the amount of the hydration stopper is preferably controlled such that the premixed material has a pH of 2 to 7, and the amount of the hydration starter is preferably 0.02 to 0.5% by mass (outer percentage), based on the total amount (100% by mass) of the refractory aggregate, the fine refractory powder and the alumina cement.

The hardened refractory body of the present invention is obtained by adding an alumina cement hydration starter to the above premixed material and mixing them, and then casting the resultant mixture.

The hydration stopper used in the castable refractory powder composition is preferably at least one selected from the group consisting of hydroxycarboxylic acids and their salts, a polyacrylic acid and its derivatives, salts of an acrylic acid, chelating agents, condensed phosphate, aluminum phosphate and a boric acid. When used in the premixed material, a phosphoric acid may be used as the hydration stopper in place of the above compounds.

The alumina cement hydration starter added to the premixed material is preferably at least one selected from the group consisting of aluminates, hydroxides, carbonates, nitrites, silicates and borates of alkali metals, and oxides and hydroxides of alkaline earth metals.

In the casting method of the present invention, it is preferable to convey the premixed material through a pipe by the action of a pump, add the alumina cement hydration starter to the premixed material in the pipe and mix them by a line mixer connected to the pipe, and cast the resultant mixture from the outlet into the mold.

The storable days of the premixed material of the present invention after production (days during which the premixed material retains castable flowability) are 5 days or more, preferably 7 days or more. Accordingly, there may be 5 days or more, preferably 7 days or more from the production of the premixed material to the addition of the hydration starter.

THE BEST MODE FOR CARRYING OUT THE INVENTION

Figure 1A:
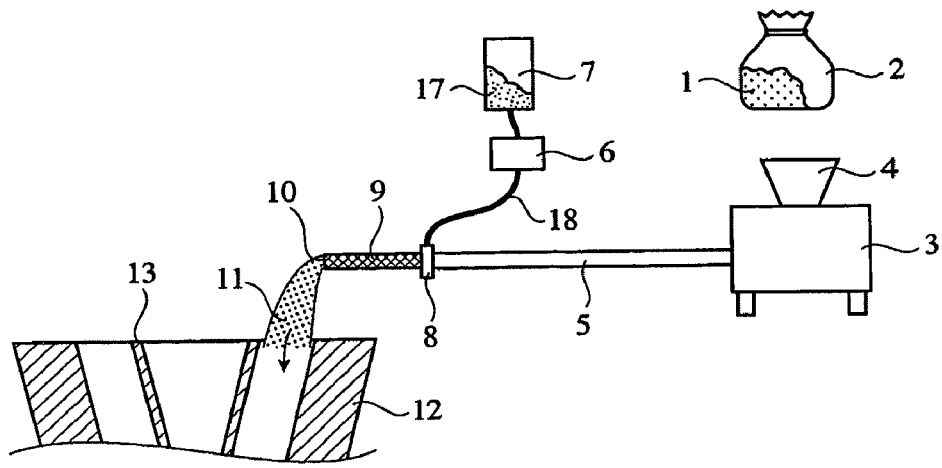
FIG. 1(a) is a partial cross-sectional view showing one example of an apparatus for casting the premixed material of the present invention, which comprises a line mixer having an outlet at one end.

[1] Castable Refractory Powder Composition and Premixed Material

The castable refractory powder composition of the present invention comprises refractory aggregate, fine refractory powder, alumina cement, a dispersing agent and a small amount of powdery alumina cement hydration stopper. The castable refractory powder composition may properly comprise thickeners, reinforcing materials, agents for preventing explosive spalling, antioxidants, etc., if necessary, in addition to the above components. The premixed material of the present invention is prepared by tempering the above-described castable refractory powder composition with water to castable flowability in advance.

(A) Alumina Cement

The alumina cement of JIS Class 1, 2 or 3 is preferably used in the present invention to provide the resultant cast refractories with fire resistance, corrosion resistance and high-temperature strength, etc. The amount of the alumina cement depends on the type of the hydration stopper.

The amount of the alumina cement is preferably 0.1 to 12% by mass based on the total amount (100% by mass) of the refractory aggregate, the fine refractory powder and the alumina cement. When the amount of the alumina cement is less than 0.1% by mass, the resultant hardened refractory body does not have sufficient strength when a mold is removed. On the other hand, when it exceeds 12% by mass, the premixed material has poor storability, resulting in a deteriorated corrosion resistance. The amount of the alumina cement is more preferably 0.3 to 8% by mass.

(B) Hydration Stopper

The hydration stopper is a material, whose aqueous solution is acidic. When the castable refractory powder composition per se is merchandised, the hydration stopper should be powdery. Preferable examples of the powdery hydration stopper include hydroxycarboxylic acids and their salts, a polyacrylic acid and its derivatives, salts of an acrylic acid, chelating agents, condensed phosphate, aluminum phosphate and a boric acid, which may be used alone or in combination. On the other hand, when the premixed material is merchandized, the hydration stopper needs not be in a powdery state but may be phosphoric acid usually sold in a water-containing state.

Specific examples of the hydroxycarboxylic acid or its salt include glycolic acid, lactic acid, citric acid, sodium dihydrogen citrate, tartaric acid, malic acid, malonic acid, gluconic acid, basic aluminum lactate [for instance, "TAKICERAM GM" (trade name) containing 32% by mass of $Al_2O_3$, 45.5% by mass of lactic acid and 4.8% by mass of $P_2O_5$, available from Taki Chemical Co., Ltd.], etc. Because lactic acid and gluconic acid are liquids, they are added to the premixed material.

The polyacrylic acid derivatives are copolymers of an acrylic acid monomer and another monomer. Another monomer is selected from those having no adverse effect on the solubility of the polymers in water. The salts of an acrylic acid may be aluminum acrylate, etc. The chelating agents may be EDTA, etc. Examples of the condensed phosphate include acidic sodium pyrophosphate, sodium hexametaphosphate, acidic sodium hexametaphosphate, sodium ultrapolyphosphate, etc.

Among the hydration stoppers usable in the present invention, condensed phosphate and a polyacrylic acid may also be used as a dispersing agent. However, the amount of condensed phosphate or a polyacrylic acid added as the dispersing agent is usually about 0.05 to 0.15% by mass, too small to make the premixed material have a pH of 2 to 7. For instance, in the case of sodium ultrapolyphosphate, as described in Example 8 below, the amount of sodium ultrapolyphosphate added is preferably 0.4% by mass. The inventors have unexpectedly found that condensed phosphate and a polyacrylic acid acting as the dispersing agent when added in a small amount would be able to stop the hydration reaction of the alumina cement, making it possible to store the premixed material for 5 days or more, if they were added in such an increased amount as to make the premixed material have a pH of 2 to 7.

Accordingly, the amount of the acidic hydration stopper should be adjusted to make the premixed material have a pH of 2 to 7, though it may mainly depend on the acidity of the hydration stopper and the amount of the alumina cement in the castable refractory powder composition. When the premixed material has a pH of higher than 7, the hydration-stopping effect is too small to have high storability. On the other hand, when the premixed material has a pH of lower than 2, the premixed material is likely to be false setted, similarly failing to have high storability. It is presumed that considerable heat generation in this false setting phenomenon is caused by a direct chemical reaction between the alumina cement and the acid. The premixed material preferably has a pH of 3 to 6.

It is presumed that the acidic hydration stopper functions according to the following mechanism. When brought into contact with water, the alumina cement is immediately reacted to elute $Ca^{2+}$ and $Al^{3+}$ ions. As a result, the pH of water increases, and a hydrate of alumina cement starts to be deposited when the pH reaches a certain level. However, the existence of the acidic hydration stopper captures $Ca^{2+}$, so that the added water kept slightly acidic functions to suppress the hydration reaction of alumina cement. In addition, the gelation of aluminum hydroxide, one of alumina cement hydrates, occurs. This aluminum hydroxide gel is deposited on and covers a surface of the alumina cement. It is presumed that though the amount of the aluminum hydroxide gel formed is small, the aluminum hydroxide gel stably exists on the surface of the alumina cement in a state where the added water is kept acidic, so that the hydration reaction of the alumina cement stops. Of course, this presumption concerning the hydration-stopping mechanism does not restrict the scope of the present invention.

The hydration reaction of the premixed material of the present invention containing the hydration stopper stops at least for 5 days after production, preferably for 7 days or more. As a result, the storable days of the premixed material (days during which it has castable flowability) are 5 days or more, preferably 7 days or more. Accordingly, there are sufficient days from production in a factory to storing, transportation to a casting site and casting at the site.

(C) Refractory Aggregate and Fine Refractory Powder

Usable as the refractory aggregate is at least one selected from the group consisting of electrofused alumina, sintered alumina, bauxite, kyanite, andalusite, mullite, chamotte, pyrophyllite, quartz, alumina-magnesia spinel, magnesia, zircon, zirconia, silicon carbide, graphite, pitch, etc., and two or more of them may be used in combination, if necessary. Usable as the fine refractory powder is fine powder of at least one selected from the group consisting of alumina, amorphous silica, silica, titania, mullite, zirconia, chromia, silicon carbide, carbon, clay, etc. The fine refractory powder preferably has an average size of 70 μm or less. The use of ultrafine refractory powder as small as 10 μm or less, preferably 1 μm or less as part of the fine refractory powder provides a premixed material with good flowability even with a reduced amount of water, when used with a dispersing agent.

(D) Dispersing Agent

Preferable examples of the dispersing agent include sodium hexametaphosphate, acid sodium hexametaphosphate, condensed phosphate such as sodium ultrapolyphosphate, etc., β-naphthalenesulfonate-formalin condensates, melamine sulfonate-formalin condensates, an aluminosulfate and its salts, a lignin sulfonic acid and its salts, a polyacrylic acid and its salts, and polycarboxylic acids and their salts, etc., and they may be used alone or in combination.

The amount of the dispersing agent is preferably 0.01 to 1% by mass (outer percentage) based on the total amount (100% by mass) of the refractory aggregate, the fine refractory powder and the alumina cement. When the amount of the dispersing agent is less than 0.01% by mass or more than 1% by mass, it is difficult to obtain a good dispersion of the fine refractory powder. Because all dispersing agents may not necessarily be added in the above range, the amount should be properly changed depending on the type of the dispersing agent. For instance, when condensed phosphate and a polyacrylic acid and its salts are used, their amount is usually about 0.05 to 0.15% by mass.

(E) Other Components

In addition to the above components, the castable refractory powder composition of the present invention may contain other components in a range (outer percentage), in which the storability of the premixed material and the function of the hydration starter are not hindered. For instance, it may contain inorganic or metal fibers for improving the strength of the cast body, organic fibers or foaming agents for preventing steam explosion during drying, antioxidants such as boron carbide, etc. The premixed material of the present invention may further contain thickeners such as cellulose derivatives, gums, alginates, etc., for preventing the separation of the aggregate or water during transportation.

(F) Amount of Tempering Water

The premixed material of the present invention is controlled to have castable workability by tempering the above castable refractory powder composition with water in advance, and the amount of the tempering water is an important factor to obtain a dense refractory body. The density of the refractory body can be increased by uniformly tempering the castable refractory powder composition with the tempering water in such a reduced amount that the flowability is not deteriorated. Though greatly affected by the specific gravity and porosity of refractory aggregate and fine refractory powder used, the particle size distribution of a refractory composition, other components, etc., the amount of the tempering water is preferably about 4.5 to 9% by mass (outer percentage), and more preferably 5 to 8.5% by mass (outer percentage), based on 100% by mass of the castable refractory powder composition. When the amount of the tempering water is less than 4.5% by mass, the resultant premixed material has low flowability. On the other hand, when it exceeds 9% by mass, the separation of the aggregate and water from the premixed material tends to occur during transportation.

[2] Hydration Starter

The hydration starter is a material for recovering the stopped hydration of the alumina cement. Usable as the hydration starter is at least one selected from the group consisting of aluminates, hydroxides, carbonates, nitrites, silicates and borates of alkali metals, and oxides and hydroxides of alkaline earth metals. The type and amount of the hydration starter should be determined depending on the type and amount of the hydration stopper added to the premixed material.

The amount of the hydration starter added is preferably 0.02 to 0.5% by mass (outer percentage) based on the total amount (100% by mass) of the refractory aggregate, the fine refractory powder and the alumina cement. When two or more hydration starters are used in combination, their total amount is preferably 0.02 to 0.5% by mass (outer percentage). When it is less than 0.02% by mass, sufficient strength is not obtained. When it exceeds 0.5% by mass, the false setting of the material occurs, resulting in difficulty in casting. The amount of the hydration starter is more preferably 0.04 to 0.3% by mass (outer percentage). The hydration starter may be added in the form of a solution or slurry.

It is presumed that the hydration starter functions according to the following mechanism. When added to the premixed material, the hydration starter turns water in the premixed material alkaline because it is alkaline. Alkaline water dissolves a film of an aluminum hydroxide gel covering the surface of the alumina cement, exposing an unreacted new surface of the alumina cement, thereby starting the hydration reaction of the alumina cement.

[3] Casting Method

The method for casting the premixed material of the present invention comprises adding the alumina cement hydration starter to the premixed material and mixing them immediately before casting, and then casting the resultant mixture into a mold. A means for adding the alumina cement hydration starter to the premixed material and mixing them is not restrictive, but may be a usual mixer or other means. However, it is preferable to use a line mixer as a mixing means, to make in-site mixing unnecessary as one of the advantages of the premixed material, and to save labor in a mixing step.

The line mixer is an apparatus having no driving means but a mechanism of disturbing a fluid flow by the energy of an entering fluid. Accordingly, the line mixer in a piping system uniformly mixes a fluid (for instance, different liquids, powder or these mixtures). Usable as the line mixer are a static mixer, a twisted pipe, combined different-size pipes, etc., and the static mixer is preferable in excellent stirring capacity.

The static mixer is a tubular apparatus having spiral mixing elements mounted therein, so that two or more fluids passing through the pipe can be uniformly mixed. Thus, the static mixer may be called "stationary mixer." A preferred example of the static mixer is disclosed in JP 2000-356475 A. Particularly preferable is a static mixer comprising 6 or more mixing elements of 40 to 150 mm in inner diameter with an axial length/inner diameter ratio of 1.5 to 3.

Referring to FIG. 1(a), an example of the casting method using the line mixer is explained below. The depicted casting apparatus comprises a pipe 5, a pump 3 disposed upstream of the pipe 5, a hopper 4 mounted to the pump 3, a line mixer 9 having an outlet 10 attached to the downstream end of the pipe 5 via a hydration-starter-injecting means 8, a metering pump 6 disposed upstream of the pipe 18 connected to the hydration-starter-injecting means 8, and a vessel 7 disposed upstream of the pump 6 for storing an aqueous solution or slurry 17 of the hydration starter.

The castable refractory powder composition containing a small amount of an alumina cement hydration stopper is first tempered with water to have castable workability in advance in a different site than a casting site, such as a production factory, etc. The resultant premixed material 1 is stored in a plastic container bag 2, etc., such that water is not evaporated, and transported to a casting site on demand. In the casting operation, the premixed material 1 is charged into the hopper 4, and conveyed to the outlet 10 through the pipe 5 by the action of the pump 3. During conveying, the aqueous solution or slurry 17 of the hydration starter is injected from the hydration-starter-injecting means 8 into the pipe 5 by the action of the metering pump 6. While passing through the line mixer 9, the aqueous solution or slurry 17 of the hydration starter is uniformly mixed with the premixed material 1 to form a room-temperature-hardenable premixed material 11. The room-temperature-hardenable premixed material 11 is cast from the outlet 10 into a mold 13 (in the depicted example, space between a permanent lining 12 for a molten metal and the mold 13).

Thought not particularly restricted, the pump 3 used in the present invention is preferably a piston type or a squeeze type. As long as the aqueous solution or slurry 17 of the hydration starter can be introduced into the premixed material 1 conveyed through the pipe 5 under pressure, the hydration-starter-injecting means 8 is not particularly restricted. It may be, for instance, a so-called dry-gunning nozzle body with a ring therein uniformly having about 8 to 16 apertures or slits for introducing water, which is connected to a nozzle. The metering pump 6 used for introducing the aqueous solution or slurry 17 of the hydration starter into the pipe 5 is preferably a multiple non-pulsating plunger pump or mohno (NEMO®) pump, more preferably a multiple non-pulsating plunger pump capable of conducting high-pressure injection. The injection pressure of the metering pump 6 is preferably 5 kgf/cm² or more.

Figure 1B:
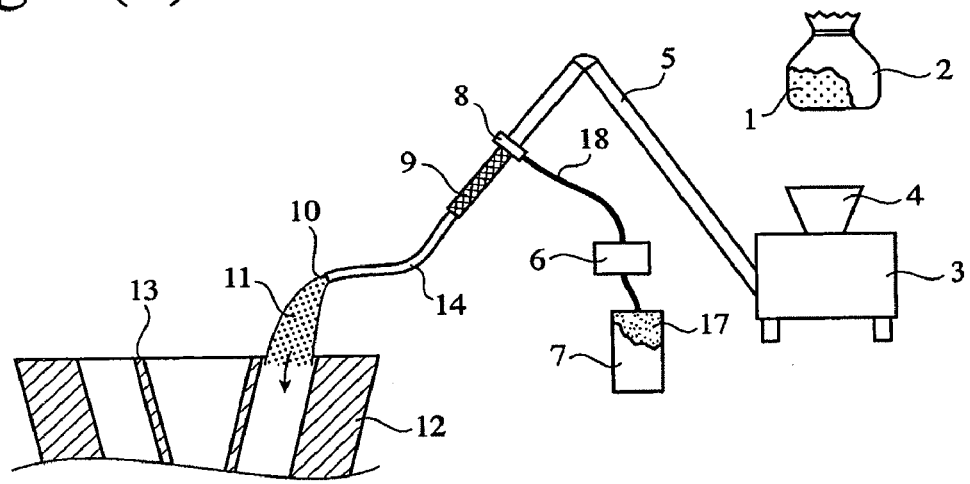
FIG. 1(b) is a partial cross-sectional view showing another example of an apparatus for casting the premixed material of the present invention, which comprises a line mixer and a flexible hose connected to a tip end thereof.

Though the line mixer 9 is adjacent to the hydration-starter-injecting means 8 in the example shown in FIG. 1, the position of the line mixer 9 may be properly changed. For instance, part of the pipe 5 may extend between the line mixer 9 and the hydration-starter-injecting means 8. Though one end of the line mixer 9 serves as an outlet 10 in the example shown in FIG. 1(a), a flexible hose 14 made of rubber, etc., may be connected to the line mixer 9 as shown in FIG. 1(b) for easy handling, when a casting site is narrow and congested, or when a casting site is located at such a high position that the arrangement of the pipe is restricted.

The present invention will be explained in more detail referring to Examples below without intention of restricting the scope of the present invention.

REFERENCE EXAMPLE 1

With respect to aqueous solutions of various hydration stoppers for alumina cement, the measurement results of their pH are shown in Table 1. The concentrations of the hydration stoppers whose pH was measured are as follows. For comparison, the pH of trisodium citrate is also shown.

TABLE 1

| Hydration Stopper | pH |
|---|---|
| Citric Acid | 1.8[1] |
| Sodium Dihydrogen Citrate | 3.6[1] |
| Basic Aluminum Lactate (TAKICERAM GM) | 4.6[1] |
| Tartaric Acid | 1.6[1] |
| Polyacrylic Acid | 2.1[1] |
| Chelating Agent EDTA | 4.3[1] |
| Sodium Hexametaphosphate | 6.0[1] |
| Acidic Sodium Hexametaphosphate | 1.3[1] |
| Sodium Ultrapolyphosphate | 1.4[1] |
| Phosphoric Acid | 0.9[2] |
| Aluminum Phosphate | 1.4[3] |
| Boric Acid | 4.3[1] |
| Trisodium Citrate | 8.2[1] |

Note:
[1]pH was measured on 5 g of powder in 100 cm$^3$ of water.
[2]pH was measured on 5 cm$^3$ of a phosphoric acid solution (solid concentration: 85% by mass) in 95 cm$^3$ of water.
[3]pH was measured on 5 cm$^3$ of an aluminum phosphate solution (solid concentration: 73% by mass) in 95 cm$^3$ of water

EXAMPLES 1 TO 9, COMPARATIVE EXAMPLES 1 TO 3

Various hydration stoppers shown in Table 1 were added to a castable refractory powder composition having a formulation shown in Table 2, and the resultant composition was tempered with 6.5% by mass (outer percentage) of water in a utility mixer to prepare a premixed material. The resultant premixed material was stored at 25±1° C. The relations between the pH and storability of the resultant premixed materials are shown in Table 3.

TABLE 2

| Components | Formulation (% by mass) |
|---|---|
| Refractory Aggregate | |
| Electrofused Alumina (Particle Size: 8 to 5 mm) | 7 |
| Electrofused Spinel (Particle Size: 5 to 1 mm) | 34 |
| Electrofused Alumina (Particle Size: 1 mm or less) | 24 |
| Fine Refractory Powder | |
| Electrofused Alumina (Particle Size: 200 μm or less) | 7 |
| Silicon Carbide (Particle Size: 200 μm or less) | 15 |
| Calcined Alumina (Particle Size: 10 μm or less) | 7 |
| Carbon Black (Particle Size: 1 μm or less) | 1 |
| Amorphous Silica (Particle Size: 1 μm or less) | 2 |
| Pitch | 1 |
| Alumina Cement (JIS Class 1) | 2 |
| Dispersing Agent | |
| β-Naphthalenesulfonate-Formalin Condensate | 0.1[1] |
| Other components | |
| Polypropylene fibers | 0.07[1] |
| Carboxymethylcellulose | 0.02[1] |
| Amount[2] of Tempering Water | 6.5[1] |

Note:
[1]Outer percentage.
[2]Based on 100% by mass of the castable refractory powder composition.

TABLE 3

| | No. | | | |
|---|---|---|---|---|
| | Example 1 | Example 2 | Example 3 | Example 4 |
| Hydration Stopper 1 (% by mass) | Basic Aluminum Lactate (1%) | Citric Acid (0.5%) | Tartaric Acid (0.2%) | EDTA (0.7%) |
| Hydration Stopper 2 (% by mass) | Sodium Hexametaphosphate (0.3%) | — | — | — |
| Amount[1] of Tempering Water | 6.5 | 6.5 | 6.5 | 6.5 |
| pH[2] of Premixed Material | 5 to 6 | 4 | 4 | 5 to 6 |
| Storable Days at 25° C. | 7< | 7< | 7< | 7< |

| | No. | | | |
|---|---|---|---|---|
| | Example 5 | Example 6 | Example 7 | Example 8 |
| Hydration Stopper 1 (% by mass) | Phosphoric Acid (0.05%) | Aluminum Phosphate (0.1%) | Polyacrylic Acid (0.8%) | Sodium Ultrapolyphosphate (0.4%) |
| Hydration Stopper 2 (% by mass) | — | — | — | — |
| Amount[1] of Tempering Water | 6.5 | 6.5 | 6.5 | 6.5 |
| pH[2] of Premixed Material | 5 | 4 | 4 | 4 |
| Storable Days at 25° C. | 7< | 7< | 7< | 7< |

| | No. | | | |
|---|---|---|---|---|
| | Example 9 | Comparative Example 1 | Comparative Example 2 | Comparative Example 3 |
| Hydration Stopper 1 (% by mass) | Sodium Hexametaphosphate (0.3%) | Sodium Hexametaphosphate (0.1%) | Trisodium Citrate (0.8%) | Phosphoric Acid (0.15%) |
| Hydration Stopper 2 (% by mass) | Boric Acid (0.2%) | Boric Acid (0.1%) | — | — |

TABLE 3-continued

| | | | | |
|---|---|---|---|---|
| Amount[1] of Tempering Water | 6.5 | 6.5 | 6.5 | 6.5 |
| pH[2] of Premixed Material | 5 to 6 | 8 | 12 | 1 |
| Storable Days at 25° C. | 7< | 1> | 1> | 1> |

Note:
[1]Outer percentage.
[2]Measured on a day when it was produced.

In Examples 1 to 9, basic aluminum lactate (TAKICERAM GM)+sodium hexametaphosphate, citric acid, tartaric acid, a chelating agent (EDTA), phosphoric acid, aluminum phosphate, polyacrylic acid, sodium ultrapolyphosphate, or sodium hexametaphosphate+boric acid were added as a hydration stopper to the castable refractory powder composition. In any Examples, the pH of the premixed material could be controlled within 2 to 7 on a day when they were produced. Any of these premixed materials had a storable day of 1 week or more.

On the contrary, in Comparative Example 1 using the same hydration stopper (sodium hexametaphosphate+boric acid) as in Example 9, the resultant premixed material had as high pH as 8 because the hydration stopper was added in an insufficient amount. In Comparative Example 2 using trisodium citrate as alkaline as pH 8.2, improper as the hydration stopper, the resultant premixed material had as extremely high pH as 12. As a result, in both Comparative Examples 1 and 2, the storable days of the premixed materials were as short as less than one day. In Comparative Example 3 using phosphoric acid as the hydration stopper, the resultant premixed material had as low pH as less than 2. It is thus highly likely that an acid-base reaction occurred directly between phosphoric acid and alumina cement, resulting in false setting with heat generation in a short period of time.

EXAMPLES 10 TO 23, AND COMPARATIVE EXAMPLES 4 AND 5

Various hydration starters were added to the premixed materials of Examples 1 to 9, to investigate the hardening speed of the premixed material hardened by each hydration starter at room temperature. The castable refractory powder compositions containing various hydration stoppers were tempered with 6.5% by mass (outer percentage) of water in a utility mixer to produce premixed materials. After the resultant premixed materials were stored at 25±1° C. for 2 days, they were mixed with various hydration starters, cast into a mold and hardened to measure their hardening time. The hardening time was a time period, in which no deformation occurred in each hardened body by pressing by a finger. The results are shown in Table 4.

TABLE 4

| | No. | | | |
|---|---|---|---|---|
| | Example 10 | Example 11 | Example 12 | Example 13 |
| Premixed Material | Example 2 | Example 3 | Example 4 | Example 5 |
| | Hydration Starter | | | |
| Type | Sodium Aluminate Solution | Calcium Hydroxide Slurry | Sodium Hydroxide Solution | Calcium Hydroxide Slurry |
| Concentration (% by mass) | 19 | 10 | 25 | 10 |
| Amount (% by mass) | 1.0 | 0.5 | 0.5 | 0.5 |
| Concentration (% by mass) on Solid Basis | 0.19 | 0.05 | 0.125 | 0.05 |
| Hardening Time (hours) at 25° C. | 14 | 6 | 3 | 7 |

| | No. | | | |
|---|---|---|---|---|
| | Example 14 | Example 15 | Example 16 | Example 17 |
| Premixed Material | Example 6 | Example 7 | Example 8 | Example 9 |
| | Hydration Starter | | | |
| Type | Calcium Hydroxide Slurry | Sodium Silicate Solution | Sodium Silicate Solution | Calcium Hydroxide Slurry |
| Concentration (% by mass) | 10 | 25 | 25 | 10 |
| Amount (% by mass) | 0.5 | 0.5 | 0.5 | 0.5 |
| Concentration (% by mass) on Solid Basis | 0.05 | 0.125 | 0.125 | 0.05 |
| Hardening Time (hours) at 25° C. | 8 | 6 | 7 | 3 |

| | No. | | | |
|---|---|---|---|---|
| | Example 18 | Example 19 | Example 20 | Example 21 |
| Premixed Material | Example 3 | Example 9 | Example 9 | Example 3 |
| | Hydration Starter | | | |
| Type | Sodium Hydroxide Solution | Lithium Carbonate Slurry | Lithium Nitrite Slurry | Sodium Silicate Solution |
| Concentration (% by mass) | 25 | 10 | 10 | 25 |
| Amount (% by mass) | 0.5 | 0.5 | 0.5 | 0.5 |
| Concentration (% by mass) on Solid Basis | 0.125 | 0.05 | 0.05 | 0.125 |
| Hardening Time (hours) at 25° C. | 4 | 19 | 22 | 5 |

| | No. | | | |
|---|---|---|---|---|
| | Example 22 | Example 23 | Comparative Example 4 | Comparative Example 5 |
| Premixed Material | Example 9 | Example 8 | Example 8 | Example 9 |
| | Hydration Starter | | | |
| Type | Borax Slurry | Calcium Hydroxide Slurry | Lithium Carbonate Slurry | Calcium Hydroxide Slurry |

TABLE 4-continued

| | | | | |
|---|---|---|---|---|
| Concentration (% by mass) | 10 | 10 | 10 | 50 |
| Amount (% by mass) | 0.5 | 0.5 | 0.1 | 1.2 |
| Concentration (% by mass) on Solid Basis | 0.05 | 0.05 | 0.01 | 0.6 |
| Hardening Time (hours) at 25° C. | 22 | 7 | ≧2 days | False Setting |

All of the premixed materials of Examples 10 to 23 had a hardening time of within one day, which is required by usual furnace operation. On the other hand, the premixed material of Comparative Example 4 was not hardened even after 2 days because of an insufficient amount of the hydration starter (lithium carbonate), while the premixed material of Comparative Example 5 was immediately subjected to false setting because of excessive calcium hydroxide.

EXAMPLE 24

The castable refractory powder composition having the formulation of Example 1 shown in Table 3 was tempered with 6.5% by mass of water in a large-vortex mixer, to produce 20 tons of a premixed material. After the resultant premixed material was stored at room temperature (about 15 to 23° C.) for 9 days, it was conveyed to a casting site in a steel works, and cast into a large trough of a blast furnace.

Using the casting apparatus shown in FIG. 1(*a*), the premixed material was cast. The specification of the casting apparatus is shown in Table 5.

TABLE 5

| Parts | Specification |
|---|---|
| Pump 3 | Double-piston pump (maximum ejection pressure: 25 MPa) |
| Pipe 5 | Steel pipe of 100 mm in inner diameter and 30 m in length |
| Hydration-Stopper-Injecting Means 8 | Improved nozzle body with ring having 16 apertures therein |
| Metering Pump 6 | Triple non-pulsating plunger pump Flow rate: 0.5 to 33 L/min, Maximum ejection pressure: 10 MPa |
| Line Mixer 9 | Static mixer having two mixing elements twisting by 180° clockwise and counterclockwise, respectively, with their ends perpendicular to each other Number of mixing elements: 6, Inner diameter: 100 mm, Longitudinal length: 200 mm, and Material: stainless steel. |

The premixed material 1 was first introduced into a hopper 4, and conveyed under pressure through a pipe 5 by the action of a pump 3 to a hydration-starter-injecting means 8 disposed near a line mixer 9, at which 0.19% by mass (on a solid basis, and outer percentage) of a solution of sodium aluminate (concentration: 19% by mass) was introduced into the premixed material. The premixed material 1 was mixed through the line mixer 9 to obtain a room-temperature-hardenable premixed material 11, which was cast through a nozzle 10 into a cavity between a permanent lining 12 and a mold 13. The room-temperature-hardenable premixed material 11 was cast into a separate small test mold, and hardened for about 11 hours to form a refractory body. After drying this refractory body at 110° C., its properties were measured. The results are shown in Table 6.

TABLE 6

| | |
|---|---|
| Bulk Density | 2.82 |
| Bending Strength (MPa) | 1.2 |
| Compression Strength (MPa) | 8.2 |

Though the premixed material produced in a factory distant from a casting site was transported to the casting site, where the premixed material was mixed with a hydration starter and then cast, in the above Example, the present invention is not restricted to such method. For instance, the castable refractory powder composition may be transported to a casting site, where it is tempered with a predetermined amount of water to produce a premixed material for casting.

Because the premixed material of the present invention makes it possible to add and mix a hydration starter at a casting site, there is enough castable time, resulting in easy casting operation.

As described in detail above, because the premixed material obtained by adding an alumina cement hydration stopper to a castable refractory powder composition containing alumina cement is not hardened for a long period of time, having an extremely long working time, it may reside in a mixer or a tank, etc., for a long period of time. At the time of casting, a necessary amount of the premixed material may be mixed with a hydration starter for alumina cement, and then cast into a mold. Accordingly, a premixed material produced in advance is not wasted, providing enough time for a casting operation.

As a result, there is no necessity for heat hardening for removing a mold from a refractory body, which is carried out in using conventional premixed materials, and thus the periodic maintenance of a mold thermally deformed by the heat hardening may be omitted, resulting in drastic reduction of energy and casting cost.

The refractory body formed by the premixed material of the present invention is free from decrease in structural strength, which is caused by rapid dehydration by heating. The use of a line mixer for adding the hydration starter to the premixed material and mixing them enables further saving of work.

What is claimed is:

1. A method for casting a premixed material comprising tempering a castable refractory powder composition comprising refractory aggregate, fine refractory powder, alumina cement, a dispersing agent and an alumina cement hydration stopper with water in advance to prepare said premixed material which can be stored with castable flowability for 5 days or more, adding an alumina cement hydration starter to said premixed material and mixing the alumina cement hydration starter and the premixed material immediately before casting, and then casting the resultant mixture into a mold at room temperature to harden said premixed material without external heat being applied to the mixture; wherein a material, which is acidic in a state of an aqueous solution, is used as said hydration stopper: wherein the amount of said hydration stopper is controlled such that said premixed material has a pH of 2 to 7; and wherein the amount of said hydration starter is 0.02 to 0.5% by mass (outer percentage), based on the total amount (100% by mass) of said refractory aggregate, said fine refractory powder and said alumina cement.

2. The method for casting a premixed material according to claim 1, wherein said hydration stopper is at least one selected from the group consisting of hydroxycarboxylic acids and their salts, a polyacrylic acid and its derivatives, salts of an acrylic acid, chelating agents, condensed phosphate, a phosphoric acid, aluminum phosphate and a boric acid; and wherein said alumina cement hydration starter is at least one selected from the group consisting of aluminates, hydroxides, carbonates, nitrites, silicates and borates of alkali metals, and oxides and hydroxides of alkaline earth metals.

3. The method for casting a premixed material according to claim 1, wherein said castable refractory powder composition comprises 0.1 to 12% by mass of said alumina cement and 0.01 to 1% by mass (outer percentage) of said dispersing agent, based on the total amount (100% by mass) of said refractory aggregate, said fine refractory powder and said alumina cement.

4. The method for casting a premixed material according to claim 1, comprising conveying said premixed material through a pipe by the action of a pump, adding said alumina cement hydration starter to said premixed material in said pipe and mixing them by a line mixer connected to said pipe at one end and having an outlet at the other end, and then casting the resultant mixture from said outlet into said mold.

5. The method for casting a premixed material according to claim 1, wherein the addition of said hydration starter can be carried out 5 days or more after the production of said premixed material.

* * * * *